United States Patent [19]

Tanaka et al.

[11] Patent Number: 5,273,579
[45] Date of Patent: Dec. 28, 1993

[54] QUICK SETTING COMPOSITIONS

[75] Inventors: Yoshio Tanaka; Tetsuro Tsutsumi; Keiji Saito; Hisanobu Tanaka, all of Omiya, Japan

[73] Assignee: Mitsubishi Mining and Cement Co., Ltd., Tokyo, Japan

[21] Appl. No.: 53,340

[22] Filed: Apr. 28, 1993

Related U.S. Application Data

[63] Continuation of Ser. No. 655,357, Feb. 19, 1991, abandoned.

[51] Int. Cl.$^5$ .............................................. C04B 7/32
[52] U.S. Cl. ................................. 106/715; 106/728; 106/732; 106/735; 106/776; 106/785
[58] Field of Search ............... 106/701, 715, 728, 732, 106/735, 765, 767, 775, 776, 785

[56] References Cited

U.S. PATENT DOCUMENTS

| | | | |
|---|---|---|---|
| 3,565,648 | 2/9171 | Mori et al. | 106/715 |
| 4,190,454 | 2/1980 | Yamagisi et al. | 106/695 |
| 4,328,039 | 5/1982 | Masuda | 106/715 |
| 4,842,649 | 6/1989 | Hertzmann et al. | 106/709 |
| 4,861,378 | 8/1989 | Watanabe et al. | 106/719 |

FOREIGN PATENT DOCUMENTS

| | | | |
|---|---|---|---|
| 0017854 | 6/1973 | Japan | 106/715 |
| 0105810 | 9/1978 | Japan | 106/728 |
| 0006594 | 2/1980 | Japan | 106/728 |
| 0073459 | 4/1984 | Japan | 106/728 |
| 2033367 | 5/1980 | United Kingdom | 106/728 |

OTHER PUBLICATIONS

Tanaka et al. "Rapid Setting Cement Compositions" Japan (Nov. 15, 1988) JP 63277542 (Chemical Abstract).

*Primary Examiner*—Mark L. Bell
*Assistant Examiner*—Paul Marcantoni
*Attorney, Agent, or Firm*—Kanesaka and Takeuchi

[57] ABSTRACT

The present invention concerns a quick setting composition capable of obtaining satisfactory strength developability irrespective of the fluctuation of the ingredients in a metallurgical slag, excellent in the strength developability at cold temperature, easy for coagulation control and inexpensive as well, which contains a cement ingredient comprising portland cement and/or mixed cement, 2 to 50% by weight at the integral ratio of a quick setting agent prepared by adding 3 to 20% by weight of an alkali carbonate at an internal ratio to a mixture comprising 40 to 95% by weight of a finely powdery metallurgical slag and 5 to 60% by weight of II-type anhydrous gypsum, based on the cement ingredient, and 0.1 to 5% by weight of a coagulation controlling agent comprising an organic acid type coagulation retarder and an alkali sulfate and/or calcium salt based on the total weight of the cement ingredient and the quick setting ingredient.

8 Claims, No Drawings

QUICK SETTING COMPOSITIONS

This application is a continuation of application Ser. No. 655,357, filed Feb. 19, 1991 now abandoned.

TECHNICAL FIELD

The present invention concerns a quick setting composition and, more in particular, it relates to a quick setting composition utilizing metallurgical slag comprising calcium aluminate as the main ingredient.

BACKGROUND ART

Quick setting materials are required for emergency repair of roads, slip-prevention for water stopping walls, water stopping works, repairing works for roads, building materials or structural materials, as well as in secondary product plants requiring improved rotation rate for forms.

As properties required for quick setting materials used in various fields as described above, it is of course essential that they set at an early stage after kneading, as well as they easily penetrate into cracks to be repaired or gaps in strata and can be cast easily into forms. That is, it is required for kneading products that they maintain such a predetermined fluidity as being capable of satisfactory processability till the completion of casting work. Further, since such materials are building materials and, generally, used in a great amount, it is also an important condition that the starting material is inexpensive.

Heretofore, there have been used for such quick setting materials, portland cement or mixed i.e. blended cement and a coagulation promoter added thereto such as sodium carbonate, calcium chloride or water glass, or quick setting cement such as alumina cement or jet cement.

However, among the conventional materials as described above, the quick setting material comprising portland cement or mixed cement and the coagulation promoter added thereto are poor in the developability of early strength after kneading and can not be applied to such places as requiring high strength. Further there are additives containing water soluble materials, which leach out during working or after setting, to possibly cause public pollution.

On the other hand, since quick setting cements such as alumina cement or jet cement require temperature, for example as high as 1330° to 1450° C. and a long time for sintering, they are extremely expensive. Therefore, since the quick setting cements are highly expensive, their use is restricted only to special works or to a case of requiring emergency and there is a limit for the range of application use. In particular, the jet cement involves a problem that the fluidity is lost just after kneading and the time keeping the fluidity required for the workings after kneading is not long. For overcoming such a drawback, if a coagulation retarder is used for prolonging the usable time, no sufficient effect for the improvement can be obtained thereby fail to attain satisfactory workability.

The present inventors have made earnest studies for dissolving the foregoing problems in the prior art and, as result, have found that a metallurgical slag comprising, as a main ingredient, calcium aluminate yielded in a great amount as by-product in a case of using aluminum for the acid removing step in steel making and refining processes has an effective property as the starting material for the quick setting composition and have previously filed a quick setting composition comprising the metallurgical slag as the ingredient prior to the present applicant (Japanese Patent Laid-Open Sho 62-260749 and Japanese Patent Laid-Open Application Sho 63-277542).

In these quick setting compositions, quick setting property is obtained by using a quick setting ingredient prepared by mixing and pulverizing a metallurgical slag containing 12 CaO.7 Al$_2$O$_3$ as the main ingredient and II-type anhydrous gypsum and a coagulation controlling agent (retardation controller) together with ordinary Portland cement or mixed cement.

Since these quick setting compositions have excellent properties such that they are satisfactory in view of the fluidity within a predetermined period of time after kneading and remarkably excellent in the developability of strength after the usable time, they are used in various applications.

However, such quick setting compositions still have the following problems (1)–(3) to be dissolved.

(1) In a case where the amount of the quick setting ingredient (metallurgical slag, II-type anhydrous gypsum and coagulation controlling agent) to be added to the cement is small (for example, less than 20%) and if the working temperature is lower than 10° C., the strength developability is extremely poor.

(2) The addition amount of the coagulation controlling agent for obtaining an identical usable time differs greatly depending on the working temperature make it difficult to control the addition amount.

(3) Since the metallurgical slag is a by-product resulting from steel making and refining processes, chemical ingredients fluctuate and the strength developability of the quick composition or the like varies depending on the chemical ingredients to sometimes fail to obtain sufficient property.

For instance, a quick setting composition using a metallurgical slag with the CaO/Al$_2$O$_3$ ratio of not greater than 1.3 shows satisfactory developability for strength in a short time of three hours of material age but increase of the strength after one day of material age, three day of material age and 7 day of material age is extremely poor.

DISCLOSURE OF THE INVENTION

The object of the present invention is to provide a quick setting composition which can obtain satisfactory strength developability irrespective of the fluctuation of the ingredients in the metallurgical slag, and is excellent in the strength developability at cold temperature, easy for coagulation control and inexpensive as well.

The feature of the quick setting composition according to the present invention resides in a quick setting composition containing a cement ingredient comprising Portland cement and/or mixed or blended cement, from 2 to 50% by weight of a quick setting ingredient at the internal ratio to the cement ingredient, and 0.1 to 5% by weight of a coagulation controlling agent based on the total weight of the cement ingredient and the quick setting ingredient, wherein the quick setting ingredient comprises a mixture of 40 to 95% by weight of a fine powdery metallurgical slag and 5 to 60% by weight of II-type anhydrous gypsum and 3 to 20% by weight of an alkali carbonate at the internal ratio, and the coagulation controlling agent comprises an organic acid type coagulation retarder and an alkali sulfate and/or calcium salt.

Namely, the quick setting composition comprises 47.6 to 97.9% by weight of a cement composition, 0.6 to 46.1% by weight of fine powdery metallurgical slag, 0.08 to 29.1% by weight of II-type anhydrous gypsum, 0.06 to 10.0% by weight of alkali carbonate, and 0.1 to 4.8% by weight of a coagulation controlling agent, wherein the total amount of powdery metallurgical slag, II-type anhydrous gypsum and alkali carbonate is 1.9 to 47.6% by weight of the total composition.

The present invention will be described specifically.

The fine powdery metallurgical slag suitable to the present invention is a metallurgical slag by-produced in the course of removing impurities in steel material upon making stainless steels of high quality. In the metallurgical slag the weight ratio of $CaO/Al_2O_3$ is in a range from 0.8 to 1.8 in the chemical ingredients as shown in latter in Table 1. Further, according to X-ray diffractiometry, it contains 12 $CaO.7Al_2O_3$ (hereinafter simply referred to as "$C_{12}A_7$") as the main ingredient and in addition, MgO, $3CaO.Al_2O_3$ (hereinafter simply referred to as "$C_3A$"). Depending on the cooling conditions, the metallurgical slag is formed into vitreous form by quenching or into a crystalline texture by gradual cooling, which most portion thereof is dusted and liable to be scattered as dusts, so that handling is difficult. In the present invention, even a quenched vitreous lumpy product or gradually cooled crystalline dusting powder can also be used.

The II-type anhydrous gypsum used in the present invention may be either of by-produced gypsum produced in the step of producing hydrofluoric acid or natural gypsum (anhydrous gypsum, gypsum dihydride) so long as it is calcined as required at 650° to 850° C. into II-type anhydrous gypsum.

The quick setting ingredient in the quick setting composition according to the present invention containing a mixture comprising 40 to 95% by weight of such a fine powdery metallurgical slag and 5 to 60% by weight of II-type anhydrous gypsum, to which an alkali carbonate is added from 3 to 20% by weight at the internal ratio.

If the fine powdery metallurgical slag is less than 40% by weight, the property the strength developability is insufficient, whereas the strength developability for long time is deteriorated if it exceeds 95% by weight. Further if the II-type anhydrous gypsum is less than 5% by weight, the strength developability for long time is poor, whereas there is a worry for the expansion destruction of the resultant setting product if it exceeds 60% by weight.

If the addition amount of the alkali carbonate is less than 3% by weight at the internal ratio based on the total amount of the metallurgical slag and the II-type anhydrous gypsum, the feature of the present invention, that is, the strength developability at cold temperature while using little amount of the quick setting agent, for example, the strength developability at a workable temperature of lower than 10° C. with the amount of the quick setting ingredient of less than 20% by weight is poor, and the strength developability may sometimes be reduced remarkably by using ordinary portland cement of different species depending on cement manufactures. In addition, if a metallurgical slag used has the $CaO/Al_2O_3$ ratio of less than 1.30 among the chemical ingredients of the metallurgical slag, increase of the strength after one day of material age of the resultant setting product is extremely worsened. On the other hand, if the addition amount of the alkali,carbonate exceeds 20% by weight, there is no remarkable difference in the effect of the addition, which is not preferred since this increases the material cost and also provides a worry for the occurrence of efflorescence. Accordingly, the addition amount of the alkali carbonate is defined as 3 to 20% by weight. As the alkali carbonate, there can be used, for example, sodium carbonate and potassium carbonate.

For the quick setting ingredient, the metallurgical slag is pulverized to a blaine specific surface area or specific surface area by blaine of 4000 to 8000 $cm^2/g$, or II-type anhydrous gypsum may be pulverized to a blaine specific surface area of 4000 to 8000 $cm^2/g$ respectively, which are admixed with the alkali carbonate and, if required, may be pulverized further. Alternatively, the metallurgical slag and the like may be mixed without previous pulverization and then pulverized to a brained value of 4000 by weight based on one part by weight of the organic acid type coagulation retarder is preferred. The initial strength developability is reduced if the ratio of the alkali sulfate and/or calcium salt is less than 0.25 parts by weight, whereas the retarding effect is remarkably reduced if it exceeds 7 parts by weight. In the present invention, it is particularly preferred that the coagulation controller comprises tartaric acid: citric acid: sodium sulfate and/or calcium chloride at a ratio of 1:1:1-2 (weight ratio). Although sodium citrate may also be used in this case instead of citric acid, use of citric acid is more advantageous since the strength developability of the resultant setting product after elapse of the usable time is better.

In the present invention, the coagulation retarder is defined as from 0.1 to 5% by weight based on the total weight of the cement ingredient and the quick setting ingredient. The retarding effect can not be expected if the blending amount of the coagulation controller is less than 0.1% by weight, whereas over-retardation occurs if exceeds 5% by weight to become out of a usable range as the quick setting composition.

By the way, in the conventional quick setting composition, remarkable difference depending on the working temperature of the addition amount of the coagulation to 8000 $cm^2/g$. In this case, the strength developability becomes poor if the brained value of the metallurgical slag used is less than 4000 $cm^2g$, whereas the pulverization cost is increased if it exceeds 8000 $cm^2/g$. On the other hand, if the brained value of the II-type anhydrous gypsum is less than 4000 $cm^2/g$, the strength developability is poor, as well as there is a possibility that the resultant setting product causes abnormal expansion when it is immersed in water. On the other hand, if it exceeds 8000 $cm^2/g$, the pulverization cost is increased. Accordingly, the metallurgical slag and the II-type anhydrous gypsum previously pulverized to the brained value from 4000 to 8000 $cm^2/g$ are preferably used.

In the present invention, as the organic acid type coagulation retarder among ingredients added as the coagulation controller, there can be mentioned carboxylic acids or salts thereof. Specifically, there can be mentioned one or more of oxicarboxylic acids such as tartaric acid, citric acid, malic acid or gluconic acid, or sodium salts, calcium salts, etc. thereof. As the alkali sulfate, there can be mentioned sodium sulfate and potassium sulfate. Further, as the calcium salt, there can be mentioned calcium chloride, calcium carbonate and calcium hydroxide.

As the coagulation controlling agent, an alkali sulfate and/or calcium salt blended by from 0.25 to 7 parts controller required for ensuring the usable time causes a problem in view of the working. For instance, the addition amount of the coagulation controller for obtaining a usable time of about 30 min requires an addition of 0.20 to 0.25% by weight at 20° C., and 0.7 to 1.0% by weight at 5° C. of the working temperature in the conventional coagulation controllers comprising oxicarboxylic acid: alkali carbonate=1:4 (weight ratio), and the addition amount varies greatly between the case of 20° C. and the case of 5° C. On the contrary, according to the present invention, the addition amount of the coagulation controlling agent may be from 0.15 to 0.25% by weight at about 20° C. and from 0.3 to 0.4% by weight at about 5° C. of the working temperature, in which the difference of the addition amount depending on the temperature difference is extremely narrow.

The quick setting composition according to the present invention can easily be prepared by admixing a predetermined amount of the cement ingredient, the quick setting ingredient and the coagulation controlling and it is possible to obtain a setting product of high strength with excellent coagulation property and workability by kneading with 30 to 100% by weight of an amount of kneading water.

BEST MODE FOR PRACTICING THE INVENTION

The effect of the present invention will now be explained more specifically below referring to examples and comparative examples.

EXAMPLES 1-5

To a mixture comprising a metallurgical slag (brained value:1000 cm²/g) and II-type anhydrous gypsum (fluoric acid gypsum) (brained value:2000 cm²/g) at 65:35 (weight ratio), 5% by weight of sodium carbonate at the internal ratio was added and pulverized under mixing to prepare a quick setting ingredient with the brained value of 6500 cm²/g.

The quick setting ingredient was added to an ordinary porlant cement at a ratio of cement: quick setting agent=80:20 (weight ratio) and, further, a coagulation controlling agent in an amount shown in Table 5 was added based on the total amount of the cement and the quick setting ingredient, to prepare a cement milk with 50% by weight of water content (based on the total amount of the cement and the quick setting ingredient).

The molding temperature, the usable time and the compression strength of the resultant cement milk were measured and the results are shown in Table 5.

The metallurgical slag used in each of the examples was one of metallurgical slags Nos 1-3 having the compositions in the following table 1 which were by-produced upon making stainless steels. It was confirmed that they contain $C_{12}A_7$ as the main ingredient and additionally contains MgO, $C_{3a}$ as shown in Table 1 in accordance with X-ray diffractiometry.

TABLE 1

| Metallurgical slug No. | Ingredient (wt %) | | | | | C/A* |
|---|---|---|---|---|---|---|
| | SiO$_2$ | Al$_2$O$_3$ | Fe$_2$O$_3$ | CaO | MgO | |
| 1 | 13.07 | 25.45 | 0.87 | 46.57 | 10.38 | 1.83 |
| 2 | 7.79 | 32.79 | 0.40 | 46.20 | 10.87 | 1.41 |
| 3 | 2.79 | 39.48 | 0.64 | 47.43 | 7.70 | 0.83 |

*C/A = CaO/Al$_2$O$_3$

Further, the coagulation controlling agent has the blend shown in the following Table 2.

TABLE 2

| Coagulation Controller No. | Blend (weight ratio) | | | |
|---|---|---|---|---|
| | Tartaric acid | Sodium citrate | Na$_2$SO$_4$ | CaCl$_2$ |
| A | 1 | 1 | 1 | — |
| B | 1 | 1 | — | 1 |

Comparative Example 1-3

Cement milks were prepared in the same procedures as those in Example 1 except for using the blends as shown in Table 5, the molding temperature, the usable time and the compression strength thereof are measured and the results were shown in Table 5.

TABLE 5

| Example | Metallurgical slug quick-setting ingredient | Cement: quick setting ingredient (weight ratio) | Coagulation controller | | Working temperature (°C.) | Usable time (min) | Compression strength (kgf/cm²) Material age | | | |
|---|---|---|---|---|---|---|---|---|---|---|
| | | | Kind | Amount added | | | 3 hr | 1 day | 3 day | 7 day |
| Example | | | | | | | | | | |
| 1 | No. 1 | 80:20 | A | 0.15 | 20 | 35 | 82 | 240 | 329 | 358 |
| 2 | No. 2 | 80:20 | A | 0.15 | 20 | 37 | 91 | 268 | 355 | 384 |
| 3 | No. 3 | 80:20 | A | 0.15 | 20 | 30 | 89 | 266 | 334 | 373 |
| 4 | No. 2 | 80:20 | B | 0.20 | 20 | 34 | 83 | 254 | 329 | 377 |
| 5 | No. 2 | 80:20 | A | 0.35 | 5 | 30 | 67 | 174 | 295 | 345 |
| Comparative Example | | | | | | | | | | |
| 1 | No. 2 | 80:20 | C | 0.20 | 20 | 35 | 72 | 201 | 300 | 327 |
| 2 | No. 3 | 80:20 | C | 0.20 | 20 | 27 | 79 | 105 | 108 | 202 |
| 3 | No. 2 | 80:20 | C | 0.75 | 5 | 32 | 31 | 72 | 129 | 200 |

The quick setting ingredient and the coagulation controlling agent used in the comparative examples comprise, the blends as shown in the following Table 3 and Table 4 respectively.

TABLE 3

| Comparative Example | King of metallurgical slug | Blend for quick setting ingredient (wt %) | | |
|---|---|---|---|---|
| | | Metallurgical slug | II-type anhydrous gypsum | Na$_2$CO$_3$ |
| 1 | No. 2 in Table 1 | 65 | 35 | — |
| 2 | No. 3 in Table 1 | 65 | 35 | — |
| 3 | No. 2 in Table 1 | 65 | 35 | — |

TABLE 4

| Coagulation controller No. | Blend (weight ratio) | | | |
|---|---|---|---|---|
| | Tartaric acid | Sodium citrate | Na$_2$SO$_4$ | Na$_2$CO$_3$ |
| C | 20 | — | — | 80 |

It is apparent From Table 5 that the quick setting composition according to the present invention develops a sufficient strength even with the addition of small amount of the quick setting ingredient, can obtain a comparable setting time with substantially identical blend even when the working temperature changes and, further, can ensure required developability strength even if the chemical ingredients of the metallurgical slag vary.

INDUSTRIAL APPLICABILITY

As has been described specifically above, by the quick setting composition according to the present invention, it is possible to ensure stable and satisfactory coagulation property and workability within a wide range of working temperature. In addition, a sufficient strength developability can be obtained with the small addition amount of the quick setting ingredient and a product of a desired property can be prepared easily free from the effects due to the ingredients of the metallurgical slag used. Accordingly, the quick setting composition according to the present invention has no requirement for conducting preliminary test or the like, can be used easily and effectively and enables to obtain a setting product at high strength.

In addition, since finely powdery metallurgical slag as the by-product from the steel making and refining process is used for the quick setting composition according to the present invention, it can be provided at a reduced cost and is effective for the reduction of the processing cost.

We claim:

1. A quick setting composition comprising 47.6 to 97.9% by weight of a cement composition; 0.6 to 47.1% by weight of powdery slag produced in a course of removing impurities in steel material upon making stainless steel, said powdery slag containing a calcium aluminate compound represented by 12CaO.7Al$_2$O$_3$ as a main ingredient and a ratio of Al$_2$O$_3$ to CaO being within a range from 1.8 to 0.8; 0.08 to 29.1% by weight of II-type anhydrous gypsum; 0.06 to 10.0% by weight of alkali carbonate, said powdery slag, II-type anhydrous gypsum and alkali carbonate forming a quick setting ingredient and a total amount of the quick setting ingredient being 1.9 to 50% by weight of the quick setting composition; and 0.1 to 4.8% by weight of a coagulation controlling agent, said coagulation controlling agent including a coagulation retarder and at least one of alkali sulfate and calcium salt, said coagulation retarder being at least one of oxycarboxylic acid and salt thereof and said calcium salt being at least one of calcium carbonate, calcium chloride and calcium hydroxide.

2. A quick setting composition as defined in claim 1, wherein the oxycarboxylic acid is one or more of ingredients selected from the group consisting of citric acid, tartaric acid, gluconic acid and malic acid.

3. A quick setting composition as defined in claim 1, wherein the alkali sulfate is sodium sulfate.

4. A quick setting composition as defined in claim 1, wherein the alkali carbonate is sodium carbonate.

5. A quick setting composition as defined in claim 1, wherein a mixing ratio of the coagulation retarder and at least one of the alkali sulfate and calcium salt in the coagulation controlling agent is within a range from 0.25 to 7 parts by weight of the at least one of the alkali sulfate and calcium salt based on 1 part by weight of the coagulation retarder.

6. A quick setting composition as defined in claim 1, wherein a blaine specific surface area for the powdery slag is within a range from 4000 to 8000 cm$^2$/g.

7. A quick setting composition as defined in claim 1, wherein a blaine specific surface area for the II-type anhydrous gypsum is within a range from 4000 to 8000 cm$^2$/g.

8. A quick setting composition comprising 47.6 to 97.9% by weight of a cement composition; 0.6 to 46.1% by weight of powdery slag produced in a course of removing impurities in steel material upon making stainless steel, said powdery slag containing a calcium aluminate compound represented by 12CaO.7Al$_2$O$_3$ as a main ingredient and a ratio of Al$_2$O$_3$ to CaO being within a range from 1.8 to 0.8, a blaine specific surface area for the powdery slag being within a range from 4000 to 8000 cm$^2$/g; 0.08 to 29.1% by weight of II-type anhydrous gypsum, a blaine specific surface area for the II-type anhydrous gypsum being within a range from 4000 to 8000 cm$^2$/g; 0.06 to 10.0% by weight of alkali carbonate, said powdery slag, II-type anhydrous gypsum and alkali carbonate forming a quick setting ingredient and a total amount of the quick setting ingredient being 1.9 to 50% by weight of the quick setting composition; and 0.1 to 4.8% by weight of a coagulation controlling agent, said coagulation controlling agent including a coagulation retarder and at least one of alkali sulfate and calcium salt, said coagulation retarder being at least one of oxycarboxylic acid and salt thereof and said calcium salt being at least one of calcium carbonate, calcium chloride and calcium hydroxide, a mixing ratio of the coagulation retarder and at least one of the alkali sulfate and calcium salt in the coagulation controlling agent being within a range from 0.25 to 7 parts by weight of the at least one of the alkali sulfate and calcium salt based on 1 part by weight of the coagulation retarder.

* * * * *